Figure 1:
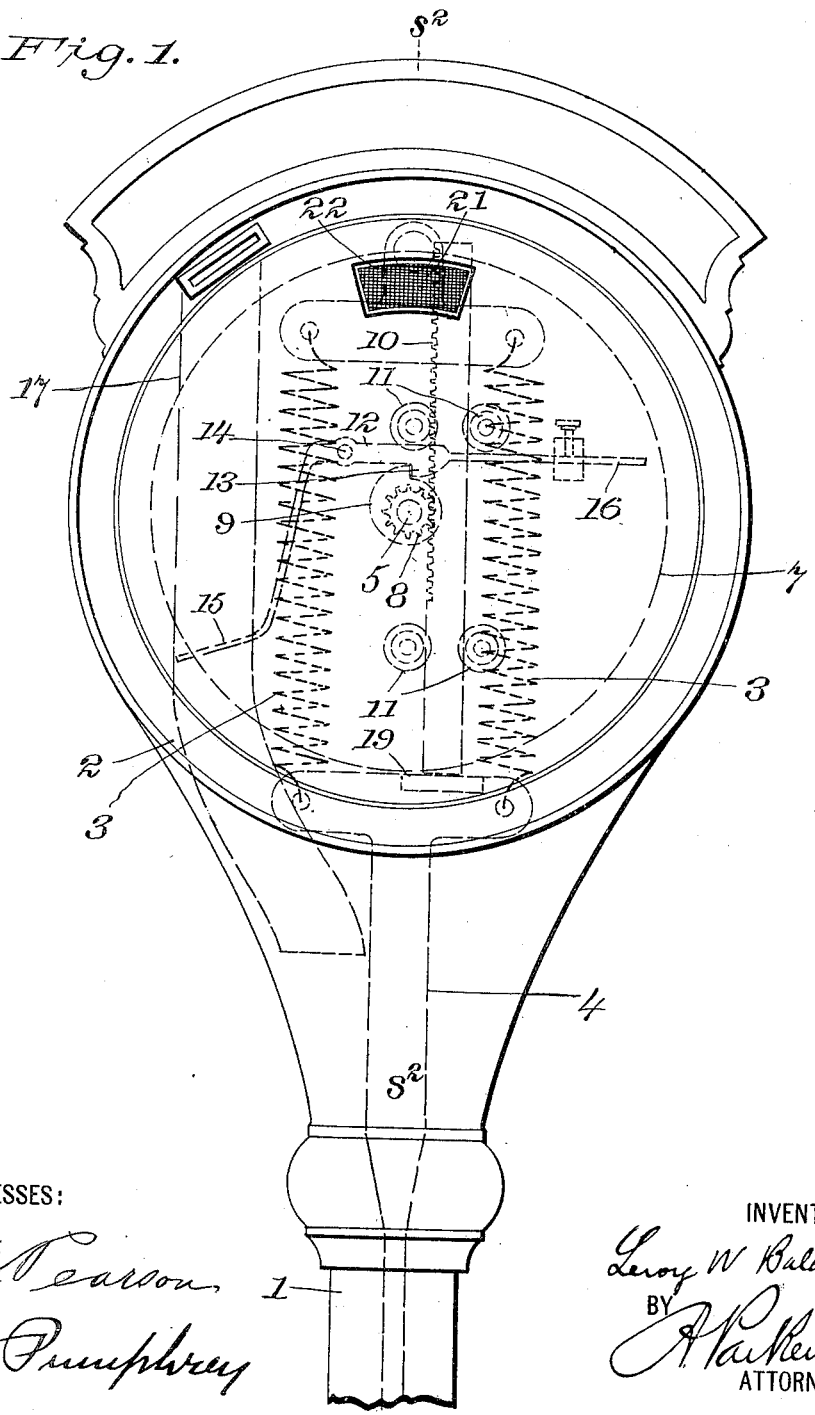

No. 675,079. Patented May 28, 1901.
L. W. BALDWIN.
DIAL FOR COIN CONTROLLED WEIGHING MACHINES.
(Application filed Jan. 18, 1901.)
(No Model.)
2 Sheets—Sheet 1.

WITNESSES:
INVENTOR
Leroy W Baldwin.
BY
ATTORNEY

No. 675,079. Patented May 28, 1901.
L. W. BALDWIN.
DIAL FOR COIN CONTROLLED WEIGHING MACHINES.
(Application filed Jan. 18, 1901.)
(No Model.) 2 Sheets—Sheet 2.
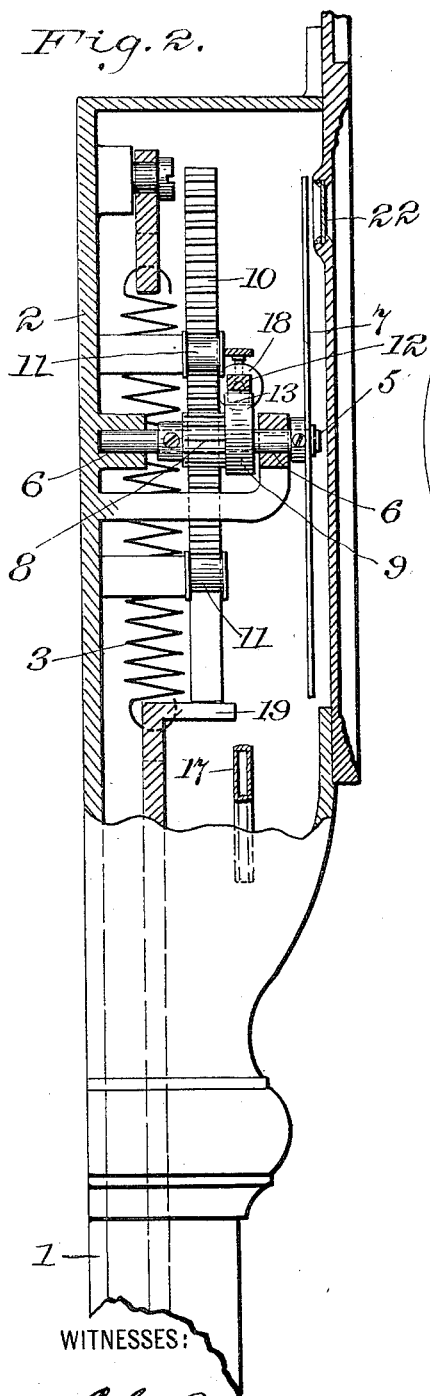
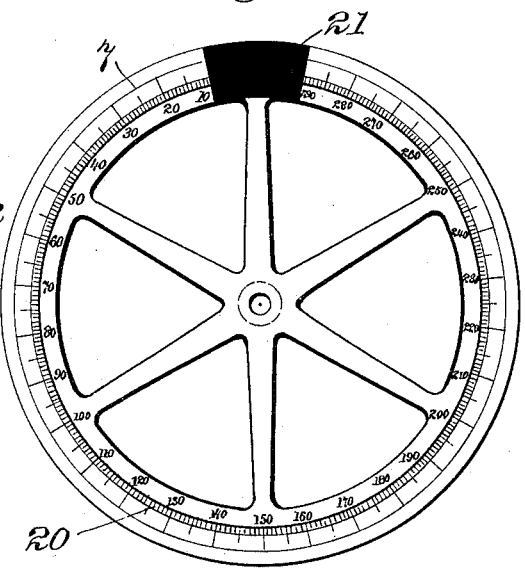

UNITED STATES PATENT OFFICE.

LEROY W. BALDWIN, OF NEW YORK, N. Y.

DIAL FOR COIN-CONTROLLED WEIGHING-MACHINES.

SPECIFICATION forming part of Letters Patent No. 675,079, dated May 28, 1901.

Application filed January 18, 1901. Serial No. 43,824. (No model.)

*To all whom it may concern:*

Be it known that I, LEROY W. BALDWIN, a citizen of the United States of America, and a resident of New York city, county of New York, State of New York, have invented certain new and useful Improvements in Dials for Coin-Controlled Weighing-Machines, of which the following is a specification.

My invention relates generally to coin-controlled weighing-machines, and is specially adapted for use in connection with machines of this class employing a rotating dial.

The object of the invention is primarily to obtain the practical result and to all appearances the identical effect of a shutter action in a rotating dial-machine without employing shutter mechanism. I attain this object by coloring or leaving blank a section of the circular scale upon the face of the dial, which colored or blank section is adapted normally— *i. e.*, when the machine is at rest—to lie directly beneath the sight-opening, the scale proper being thereby concealed and no portion thereof exposed to view through the opening. Ordinarily machines of this class are designed to operate under any weight within three hundred pounds, and the circular dial-scale is divided to indicate any weight from one pound up to which the machine becomes adjusted. Experience with these machines in actual use, however, has demonstrated that they are seldom, if ever, required to indicate less than ten or more than two hundred and ninety pounds, and this section of the scale between the marks "10" and "290," which is thus rendered practically useless, I utilize in the manner above described to produce a shutter effect by causing such blank or colored portion to lie normally beneath the sight-opening and close off a view of the dial.

The preferred form of mechanism embodying my invention is illustrated in the accompanying two sheets of drawings, throughout the several views of which like reference characters indicate corresponding parts.

In the drawings, Figure 1 is a view in front elevation illustrating the upper portion of a coin-controlled weighing-machine with my invention applied. Fig. 2 is a view in central vertical section taken on line $S^2 S^2$ of Fig. 1, and Fig. 3 is a face view of the dial.

Referring to the drawings, 1 represents the hollow standard or column, which is mounted upon the base-casting of the scale-platform and provides a support for the head-casting 2. Within the head 2 the ordinary twin weight-adjusting springs 3 3 are mounted and secured at their lower ends to the T-head of the rod 4, which latter extends through and has free play within the hollow column as a connection between these springs and the scale-platform levers. (Not shown.)

The various parts thus far described constitute the weight-adjusting mechanism, which, however, forms no part of the present invention, and it is therefore not deemed necessary to illustrate or describe the same in detail. It suffices to say that any well-known form thereof may be employed.

The indicating mechanism comprises a pinion-shaft 5, rotatable in suitable bearings 6 6 and having mounted fast upon its outer end the dial 7. This shaft carries a pinion 8 and a single-tooth disk 9, both fixed to rotate therewith. A rack-bar 10, movable vertically in guides 11 11, &c., meshes with the pinion upon the shaft 5 and is sustained in an elevated position by a lever 12, a tooth or projection 13 of which interlocks normally with the tooth of the disk to prevent rotation of the pinion-shaft toward the right or in a direction to indicate weight. This locking-lever is pivoted at 14 and provided with two arms 15 16, one of which extends downward and projects into the chute 17, so as to lie normally in the path of travel of the coin, and the other carries an adjustable counterweight 18, by means of which the action of the arm may be regulated. A projection or shelf 19 upon the T-head of the weighing-rod coöperates with the rack-bar as a stop in limiting its downward movement, which is thereby caused to vary as the weight upon the scale-platform in a manner well known in the art.

The dial (see Fig. 3) is preferably of skeleton form to reduce its weight as much as possible in order to check its tendency to rebound on reaching a weight-indicating position, and it has printed upon its face a scale 20, designed to indicate any weight from ten to two hundred and ninety pounds. That portion 21 of the dial-scale between the markings "10" and "290" lies normally beneath a glazed sight-opening 22, formed in the face-plate of the casing, and is left blank and colored, preferably in solid black, so as to present the appearance of a shutter closing off a view of the scale.

The operation is as follows: A person wishing to be weighed steps upon the platform and immediately the weight-adjusting mechanism responds, and during this portion of the operation the stop upon the T-head of the weighing-rod is carried downward to an extent determined by the amount of weight upon the platform. To obtain an indication of the weight to which the mechanism has become adjusted, a coin is inserted through the slot and in its travel downward through the chute engages and trips the locking-lever and releases the pinion-shaft, which rotates under the influence of the falling rack-bar until the movement of the latter is arrested by the stop upon the weighing-rod. This movement of the rack-bar is transmitted to the dial through the pinion-shaft, causing the dial to rotate until that point in the scale indicating the amount of the weight upon the platform appears at the sight-opening, when the various coöperating parts come to rest. The person having ascertained his weight steps from the platform, and immediately thereafter the mechanism becomes readjusted and the dial is returned to its normal position, with the blank or colored portion beneath the sight-opening.

I have not herein illustrated or described a device for locking the indicating mechanism in the weight-indicating position in order to hold the dial from oscillating and also to prevent more than one complete operation for each coin inserted; but such devices are well known and in common use and may be employed, if desired.

The advantages of my invention are as follows: In practically obtaining a shutter effect in the action of the dial the latter performs a double function, which results in dispensing with the commonly-employed shutter and mechanism for operating and locking the same. Such a reduction in the number of parts tends to greatly simplify and cheapen the cost of the machines, and being less complicated the liability of disarrangement or complete breakdown is correspondingly lessened, as is also the cost of repairs.

It will be understood that I do not wish to limit myself to the exact form or construction herein shown and described, as various changes may be made within the meaning of the present invention. Other forms of dial might be employed or the scale might be contained on a ribbon or tape having a blank or colored portion adapted to lie normally beneath the sight-opening; but all such modifications I consider obvious and immaterial variations of form and not of substance and still within the scope of my invention.

Having therefore described my invention, what I claim as new, and desire to protect by Letters Patent, is—

1. In a weighing-machine the combination with a dial-inclosing face-plate provided with a sight-opening and a weight-indicating dial having a series of scale-markings covering all of its surface except that portion normally under the sight-opening.

2. In a weighing-machine, the combination with a dial-inclosing face-plate provided with a sight-opening and a weight-indicating dial having a segmental scale upon its face, so disposed that no portion thereof is normally visible through the sight-opening.

3. In a weighing-machine, the combination with a dial-inclosing face-plate provided with a sight-opening and a weight-indicating dial having scale-markings extending throughout a portion of its circumference, said markings being normally concealed by the face-plate.

Signed at New York city this 31st day of December, 1900.

LEROY W. BALDWIN.

Witnesses:
W. H. PUMPHREY,
L. E. PEARSON.